US010181233B1

(12) United States Patent
Haber

(10) Patent No.: US 10,181,233 B1
(45) Date of Patent: Jan. 15, 2019

(54) DIGITAL SEAL SECURITY SYSTEM FOR SIDE MOUNTED SWING-OUT TYPE VEHICLE CARGO ACCESS DOORS

(71) Applicant: Greg Haber, Woodbury, NY (US)

(72) Inventor: Greg Haber, Woodbury, NY (US)

(*) Notice: Subject to any disclaimer, the term of this patent is extended or adjusted under 35 U.S.C. 154(b) by 0 days.

(21) Appl. No.: 15/786,714

(22) Filed: Oct. 18, 2017

(51) Int. Cl.

| | |
|---|---|
| ***B60R 25/10*** | (2013.01) |
| ***G07C 9/00*** | (2006.01) |
| *G07C 3/10* | (2006.01) |
| *G06M 1/00* | (2006.01) |
| *G07C 3/04* | (2006.01) |

(52) U.S. Cl.
CPC ..... *G07C 9/00896* (2013.01); *G07C 9/00309* (2013.01); *G07C 9/00817* (2013.01); *G06M 1/00* (2013.01); *G07C 3/04* (2013.01); *G07C 3/10* (2013.01); *G07C 9/00182* (2013.01); *G07C 9/00944* (2013.01); *G07C 2009/00476* (2013.01); *G07C 2009/00642* (2013.01); *G07C 2209/62* (2013.01); *G07C 2209/64* (2013.01)

(58) Field of Classification Search
CPC . B60R 25/10; B60R 25/1001; G07C 9/00896; G07C 2009/0092
USPC ..................................... 377/15, 24.1, 28, 29
See application file for complete search history.

(56) References Cited

U.S. PATENT DOCUMENTS 7,484,391 B1 * 2/2009 Moore ................. B65D 90/008
292/144
8,004,393 B2 * 8/2011 Haber ................ G07O 9/00174
340/426.28

* cited by examiner

*Primary Examiner* — Hai L Nguyen
(74) *Attorney, Agent, or Firm* — Epstein Drangel LLP; Robert L. Epstein

(57) ABSTRACT

The system includes a digital counter adapted to display a number which is changed in response to an actuation signal. A lock assembly mounted to the cargo door is connected to the counter. The lock assembly has a hollow housing within which a member having a recess adapted to receive the handle is moveable by the handle between an unlocked position, wherein the door may be opened, and a locked position, in which the door is prevented from being opened. A magnetically actuated switch is mounted within the housing. The switch is adapted to generate an actuation signal to the digital counter in response to movement of the member within the housing from its locked position. The signal causes the counter to change the displayed number, indicating that the door may have been opened in transit.

19 Claims, 8 Drawing Sheets

DIGITAL SEAL SECURITY SYSTEM FOR SIDE MOUNTED SWING-OUT TYPE VEHICLE CARGO ACCESS DOORS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

Field of the Invention

This invention relates generally to cargo security systems for vehicles and more particularly to a cargo security system designed for use with vehicles having side mounted swing-out type cargo access doors which includes a digital counter adapted to display a number that is changed in response to the opening of the access door, indicating possible unauthorized entry to the cargo compartment.

Description of the Related Art

It is common for vehicles such as trucks used to transport cargo to utilize a "physical" seal made of plastic or metal attached to the handle of the access door of the cargo compartment to indicate whether the cargo access door has been opened during transit. After the cargo is loaded into the cargo compartment and the cargo access door is closed and locked, the shipper mounts the physical seal to the latch handle of the lock attached to the door.

In order to open the truck door and access the cargo, it is necessary to move the latch handle from its locked position which results in the seal being broken. If the seal is broken, the cargo access door may have been accessed, exposing the cargo to possible tampering.

Thus, the physical seal acts as a visual indicator as to whether the access door to the cargo compartment may have been opened during transit. At the destination, the recipient of the cargo observes the physical seal when the truck arrives, before the vehicle door is opened. If the physical seal remains intact, the recipient knows that the cargo access door has not been opened and thus the cargo has not been tampered with during transit. If the seal is broken, the recipient knows that the cargo access door may have been opened, permitting unauthorized access to the cargo. In that event, the intended recipient of the cargo may not accept the shipment.

However, physical seals have an inherent disadvantage. Since the seal is located on the exterior of the cargo door, it is exposed to the elements during transit. The seal is therefore subject to being damaged or broken for reasons other than access to the cargo compartment, causing the shipper to refuse the shipment even though the cargo may be intact.

In order to provide a more reliable indication of whether cargo has been tampered with during transit, an improved cargo security system which utilizes digital technology has been invented. That system is the subject of U.S. Pat. No. 8,004,393, issued Aug. 23, 2011.

The patented security system was developed specifically for use with vehicles having roll-up type cargo access doors. In that type of door, the latch handle of the door lock is rotated about an axis perpendicular to the surface of the cargo door to move a "J" shaped hook member to engage and disengage a stationary part in the truck bed or door frame to control access to the cargo compartment.

The patented system includes a digital counter having a display which is mounted to the exterior surface of the cargo access door. The number on the counter is automatically set after the cargo compartment is secured in response to the locking of the cargo access door.

The system includes a sensor which detects movement of the latch handle toward its unlocked position to disengage the J-hook. The sensor generates an actuation signal to the digital counter causing the digital counter to change the displayed number, indicating that the cargo compartment may have been accessed after the cargo was secured.

The original number on the counter set by locking the door is forwarded by the shipper to the cargo recipient at the destination. The number may be includes in the shipping documents, or transferred by separate means, such as through the Internet. At the destination, it can be determined if the cargo compartment may have been accessed in transit by comparing the original number supplied by the shipper with the number displayed on the counter when the vehicle reaches the destination location. If the numbers are different, the cargo access door may have been opened during transit.

The patented cargo security system functions well and is currently used on many vehicles with roll-up type cargo access doors. However, it designed specifically for use on vehicles with roll-up type cargo doors. It cannot be used on vehicles that have side mounted swing-out type side cargo doors because those doors require locks of different types than those used on roll-up type cargo access doors.

In U.S. Pat. No. 8,627,693, a lock assembly is disclosed which is designed for use on a vehicle with an enclosed cargo compartment having a pair of side mounted swing-out type access doors. Each door is associated with a vertical rod that is rotatable about a vertical axis to engage and disengage a portion of the vehicle frame or bed adjacent the top and/or bottom of the door. The rod has a handle associated with it. The handle controls the rotational position of the rod about its vertical axis. A lock assembly is securely mounted to the exterior of each swing-out type side cargo door. The lock assembly is adapted to retain the handle such that the rod cannot be rotated to disengage the rod from the truck, preventing the cargo access door from being opened.

The lock assembly includes a strong rectangular hollow metal housing having an opening in the front surface adapted to receive the handle. The housing opening is inclined relative to the horizontal so that the handle, which is pivotally connected to the rod, can be received within the housing. Once the handle is secured within the housing, the rod cannot be rotated to disengage the door frame such that the door can be opened. In order to rotate the rod to disengage the door frame, the handle must be released from the lock housing.

A handle receiving member is moveably mounted by the handle within the lock housing between locked and unlocked positions. The member has recess designed to receive the handle. The recess has an inclined opening designed to align with the housing opening. In the unlocked position of the member, the member opening and housing opening align and the handle can be moved into and out of the housing. However, in the locked position of the member, the member opening is no longer aligned with the housing opening, and the handle cannot be removed from the housing. Thus, movement of the member by the handle from its unlocked position to its locked position prevents the handle from being removed from the lock housing. In that position, the handle cannot rotate the rod to disengage the truck bed or frame and the cargo access door cannot be opened.

The mechanism within the housing includes a protrusion moveable between an extended and a retracted position. The handle receiving member is engaged by the protrusion to keep the member is in its locked position such that the handle cannot be removed from the housing to rotate the rod. A lock cylinder is connected to the part which controls the position of the protrusion. When the lock cylinder is rotated to its locked position by a key, the part causes the protrusion to move from its retracted position to its extended position. That prevents the member from moving within the housing away from its locked position to a position wherein the handle can be moved from the lock housing, thereby preventing the rod from being rotated to a position where the cargo access door may be opened.

While the lock assembly of U.S. Pat. No. 8,627,693 works well with side mounted swing-out type cargo access doors, there is a need for a digital security system similar to that developed for use with the J-hook type lock of U.S. Pat. No. 8,004,393 which can be used with cargo access doors of the side mounted swing-out type.

It is, therefore, a primary object of the present invention to provide a digital security system suitable for use with side mounted swing-out type cargo access doors.

It is another object of the present invention to provide a digital security system including a digital counter and a side lock type assembly.

It is another object of the present invention to provide a digital security system for a side mounted swing-out type cargo access door wherein the number displayed on the digital counter is set when the handle of the lock latch of the access door is locked.

It is another object of the present invention to provide a digital security system for a side mounted swing-out type cargo access door having a lock including a housing and a handle receiving member moveable within the housing.

It is another object of the present invention to provide a digital security system for a side mounted swing-out type cargo access door wherein the number displayed on the digital counter is automatically changed in response to the movement of the handle receiving member within the lock housing away from its locked position.

It is another object of the present invention to provide a digital security system for a side mounted swing-out type cargo access door wherein a magnetically actuated switch detects movement of the member within the lock housing away from its locked position.

It is another object of the present invention to provide a digital security system for a side mounted swing-out type cargo access door wherein a support structure is provided within the housing to mount the switch.

It is another object of the present invention to provide a digital security system for a side mounted swing-out type cargo access door wherein a magnet is associated with the handle receiving member.

It is another object of the present invention to provide a security system for a side mounted swing-out type cargo access door wherein movement of the handle receiving member within the housing moves the magnet away from the switch causing the switch to generate an actuation signal.

It is another object of the present invention to provide a security system for a side mounted swing-out type cargo access door including a digital counter with a display, wherein the actuation signal generated by the switch causes the digital counter to change the number on the display.

It is another object of the present invention to provide a digital security system for a side mounted swing-out type cargo access door, wherein a changed number on the display indicates that the cargo access door may have been opened during transit of the vehicle.

BRIEF SUMMARY OF THE INVENTION

In general, the above objects are achieved by the present inventions which relates to a digital security system for use on a vehicle of the type having an enclosed cargo compartment with a side mounted swing-out type cargo access door, in which a rod is moveably mounted on the door for controlling access to the cargo compartment, and a handle attached to the rod for controlling the position of the rod. The system includes a digital counter adapted to display a number which is changed in response to an actuation signal. The system also includes a lock assembly associated with the counter. The lock assembly has a generally rectangular hollow housing fixed to the vehicle door. A member having a recess adapted to receive the handle is moveable within the housing by the handle between an unlocked position wherein the door may be opened and a locked position in which the door is prevented from being opened. A magnetically actuated switch is mounted within the housing. The switch is connected to the digital counter and is adapted to generate an actuation signal to the digital counter in response to movement of the member within the housing from its locked position.

A magnet is situated within the housing. The magnet is adapted to influence the switch to generate the actuation signal in response to movement of the member from its locked position.

The switch is associated with one of the member or the housing. The magnet is associated with the other of the member or the housing. Preferably, the switch is mounted to the housing and the magnet is mounted on the member.

The member has a wall with an interior surface. The magnet is mounted on the interior surface of the member wall.

The switch is mounted within the interior of the housing. The switch is mounted in alignment with the switch.

A support structure is provided within the housing for supporting the switch. The magnet is situated to influence the switch when the member is in its locked position within the housing.

The housing has an opening. The member recess is aligned with the housing opening when the member is in its unlocked position. The member recess is out of alignment with the housing opening when the member is in its locked position.

The member is generally rectangular in shape. The member is generally hollow.

The housing opening is preferably inclined relative to the horizontal.

The member includes an outwardly extending a side wall. The magnet is mounted on the side wall.

The system also includes means for locking the member within the housing in its locked position. The locking means includes a protrusion associated with the member. The protrusion is mounted for movement between an extended position wherein the member is prevented from moving from its locked position and a retracted position wherein movement of the member within the housing from its locked position is not prevented.

The locking means further includes a key actuated lock cylinder. The lock cylinder is mechanically linked to and controls the position of the protrusion.

The member has first and second spaced sides defining a space therebetween. The space is adapted to receive the locking means when the member is in its locked position.

Preferably, the magnetically actuated switch takes the form of a reed switch.

BRIEF DESCRIPTION OF THE SEVERAL VIEWS OF THE DRAWINGS

To these and to such other objects that may hereinafter appear, the present invention relates to a digital security system for use with vehicles having side mounted swing-out type cargo access doors, as described in detail in the following specification and recited in the annexed claims, taken together with the accompanying drawings, in which like numerals refer to like parts in which:

DETAILED DESCRIPTION OF THE INVENTION

The present invention is a digital seal security system designed for use on a vehicle such as a truck having an enclosed cargo compartment with a pair of side-mounted swing-out type cargo access doors 10. For each door 10, the system includes a lock assembly, generally designated A, mounted to the exterior of the door, a mechanical linkage, generally designated B, including a handle 14 pivotally connected to a vertically extending rod 16, and a digital counter, generally designated C, mounted to the exterior surface of the door.

Figure 1:
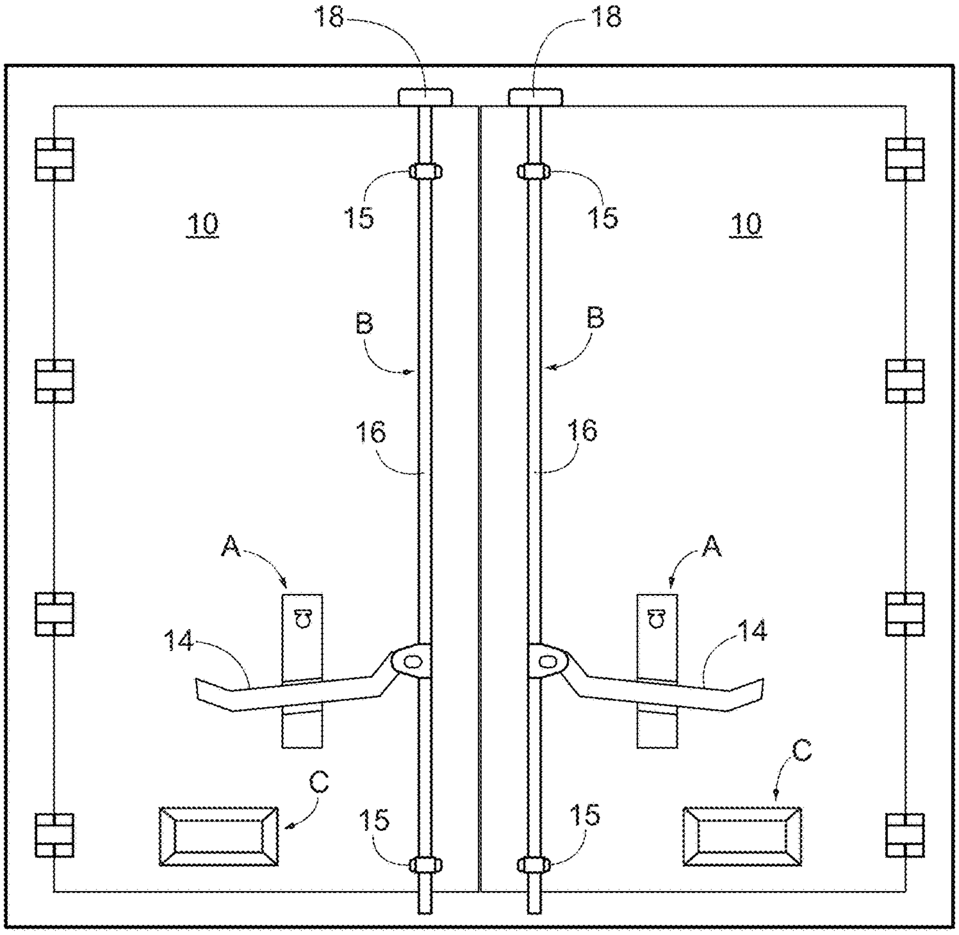
FIG. 1 is an elevation view of the rear of a truck of the type having an enclosed cargo compartment accessed through side mounted swing-out type cargo doors, each of which carries a rotatably mounted rod with a handle and a lock assembly adapted to engage the handle.
Figure 2:
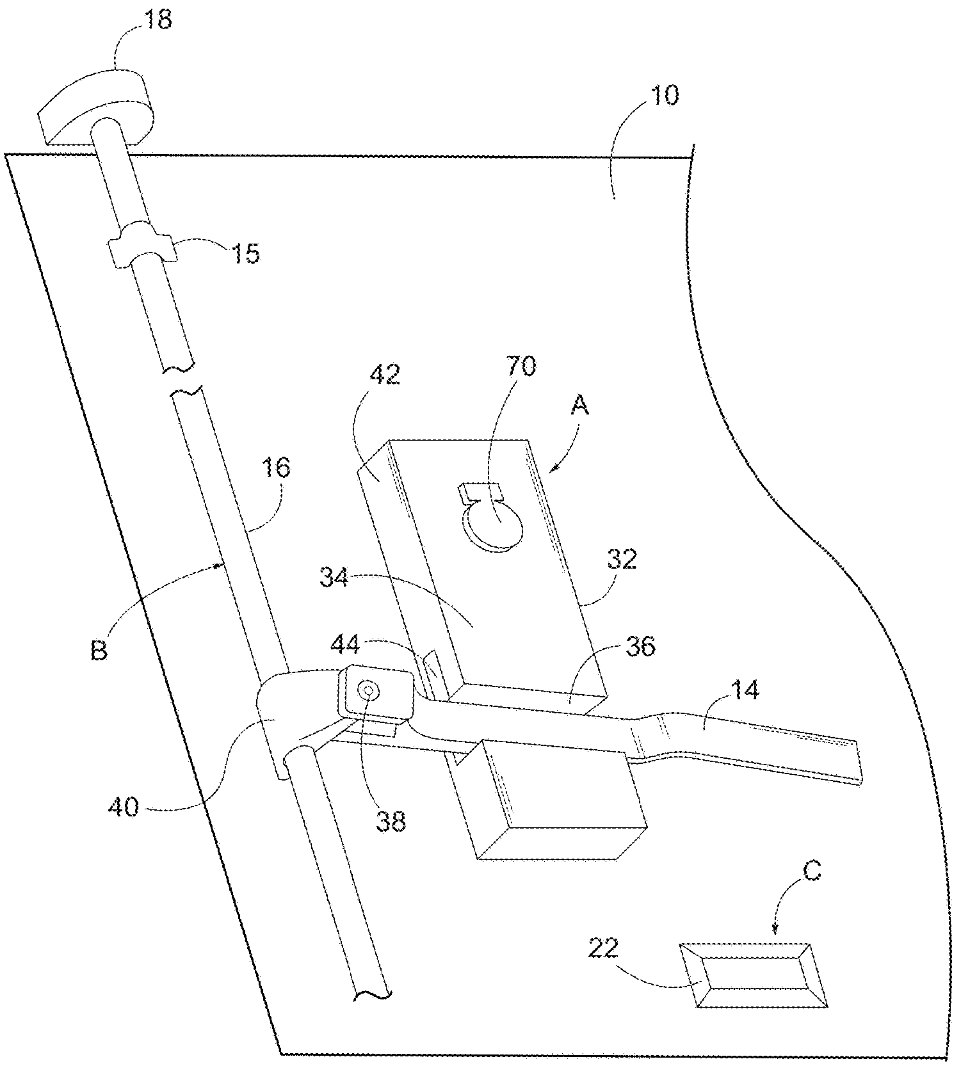
FIG. 2 is a more detailed perspective view of the handle and lock assembly of FIG. 1, showing the lock assembly in its unlocked state.
Figure 3:
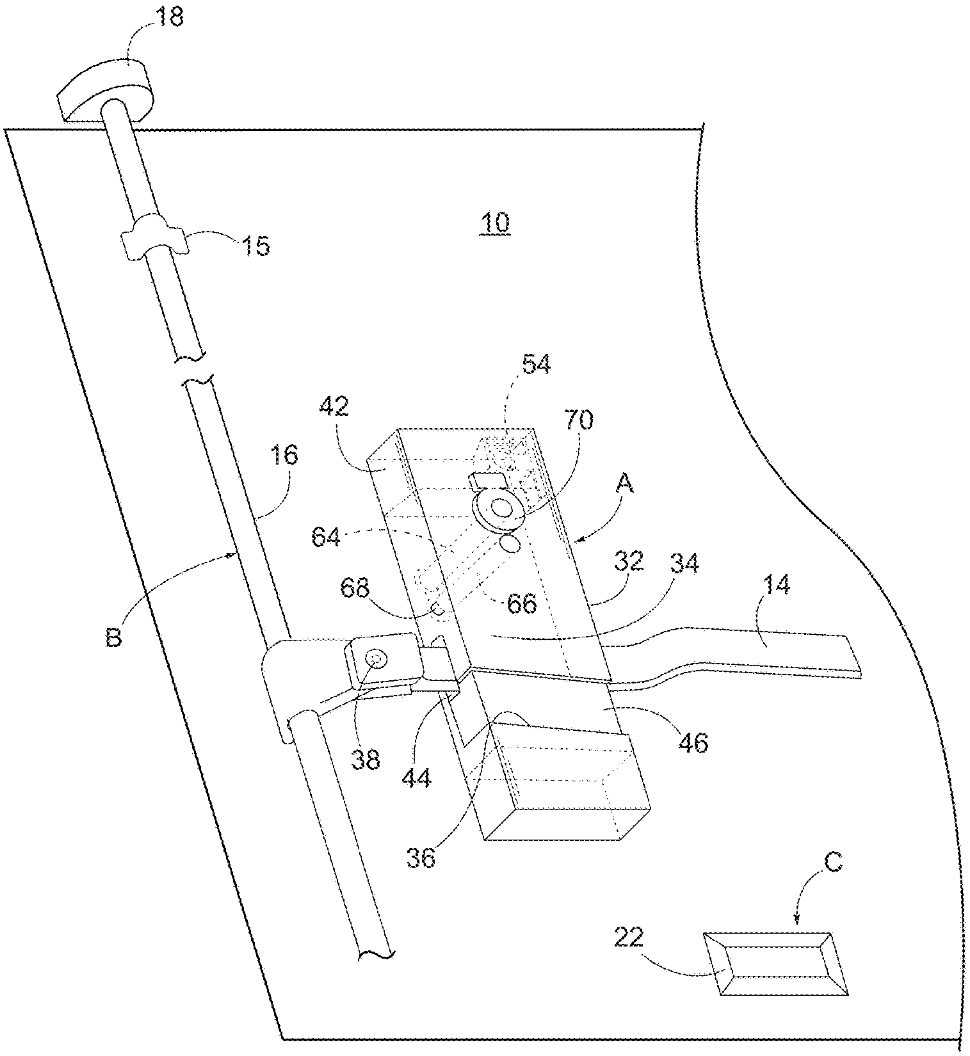
FIG. 3 is a perspective view of the lock assembly of FIG. 2, showing the handle receiving member within the lock housing in its locked position.

Rod 16 is rotatably mounted to the exterior of the door by brackets 15. The rod can be rotated about its vertical axis by movement of handle 14. When handle 14 is in a position generally parallel to the exterior of the door, handle 14 can be received within lock assembly A, as seen in FIGS. 1, 2 and 3, In that position, rod 16 engages the truck frame and prevents the door from being opened. When handle 14 is moved away from lock assembly A, rod 16 is rotated to disengage the truck frame such that the door can be opened.

At the top of rod 16 is a cam-shaped part 18. Part 18 cooperates with an aligned recess (not shown) in the door frame, which is part of the truck body, to engage and disengage the rod from the truck frame. Thus when the handle is parallel to the exterior of the cargo door, the cam at the top of the rod is in engagement with the frame of the truck and the door cannot be opened. When the handle is moved away from the lock assembly, the rod is rotated to a position wherein the cam is no longer in engagement with the truck frame and the door may be opened.

Digital counter C, which includes a display 20 situated within a housing 22, is mounted to the exterior surface of the cargo door. Display 20 is driven by an electronics module 24 which is connected by a wire 26 to a power source, such as an internal or auxiliary battery (not shown). The display is connected by wires 28 to a magnetically actuated reed switch 30 to power the switch and receive actuation signals from the switch.

The counter module includes a random number generator. After the cargo compartment is loaded, the cargo door is closed and the handle is secured within the lock assembly, the random number generator in the counter circuitry automatically generates a random number. That random number generated when the cargo is secured will appear on display 20 until an actuation signal is received by module 24 from switch 30.

The random number on the display is noted by the shipper and conveyed to the intended recipient of the cargo located at the destination of the vehicle. The number can be conveyed to the recipient with the vehicle, for example as part of the shipping documents, or separately from the vehicle, for example through the Internet.

Referring now to FIG. 3, lock assembly A includes a hollow, generally rectangular shaped housing 32 made of strong metal which is securely mounted to the exterior surface of the cargo access door. Housing 32 has a front wall 34 which has an opening 36. Opening 36 is situated such that handle 14 can pass through the front wall of the housing into the interior of the housing, as seen in FIG. 2.

Figure 4:
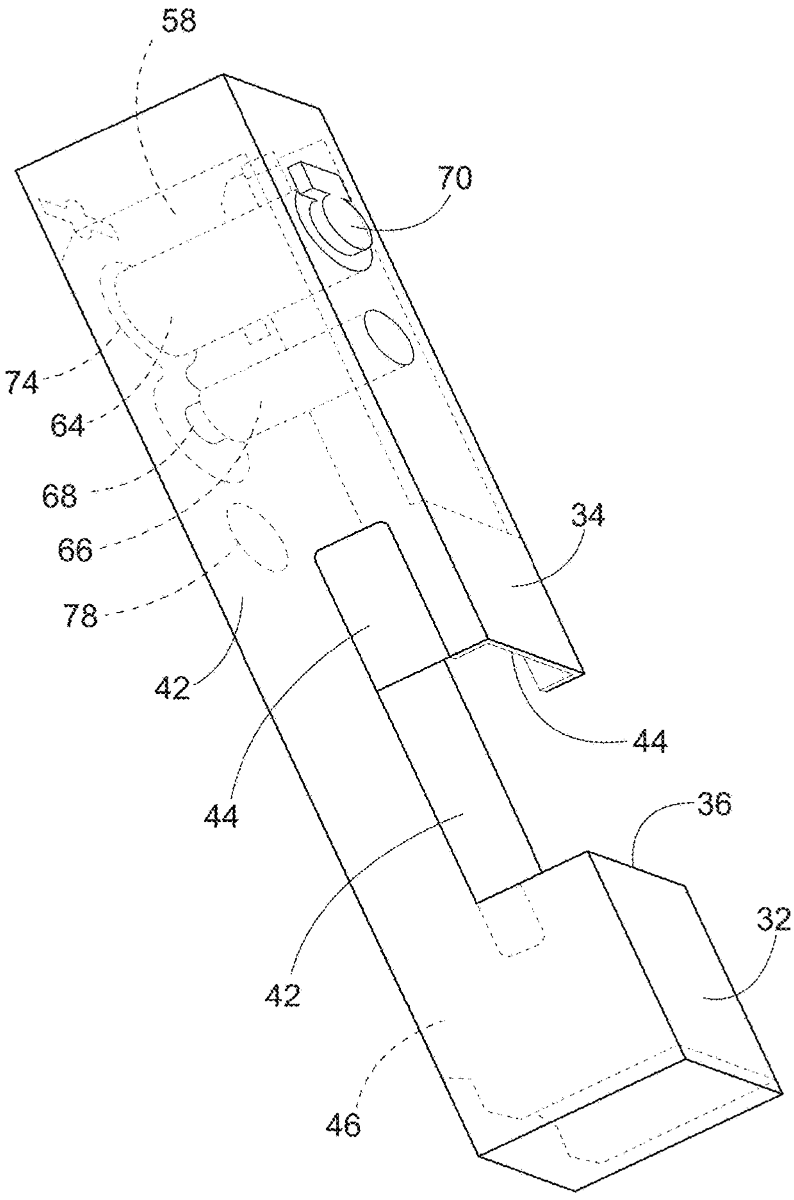
FIG. 4 is a perspective view of the housing showing the switch support.
Figure 5:
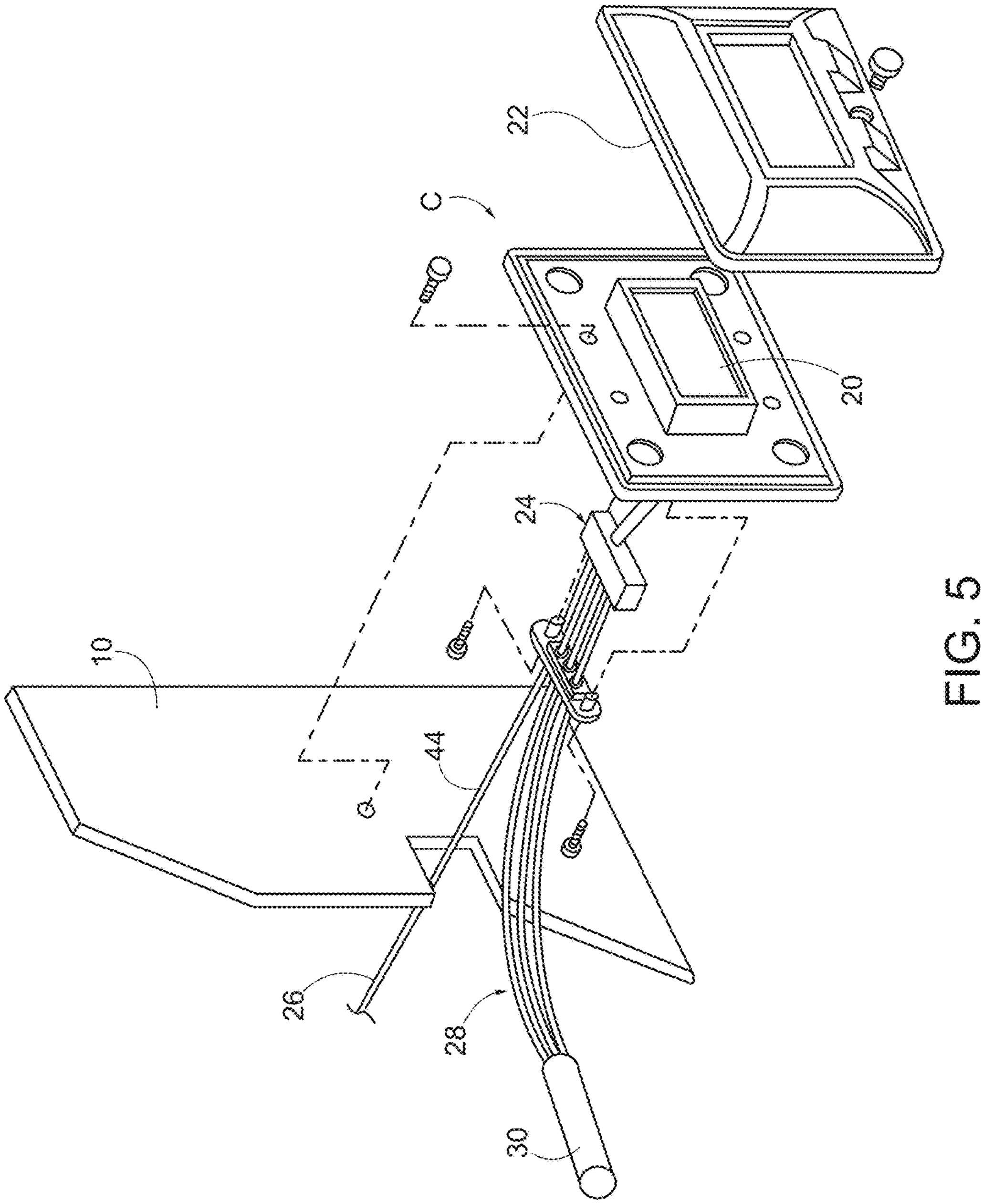
FIG. 5 is an exploded view of the digital counter.

Handle 14 is pivotally connected to rod 16 by a connecting assembly including a pin 38 and a bracket 40, the latter of which surrounds and is fixed to the rod. That assembly allows the handle to pivot relative to the rod about the pin such that the handle can move up and down within the lock housing. As best seen in FIG. 4, the side walls 42 of the housing each have a rectangular cut-out portion 44 which forms part of opening 36. That cut-out portion 44 allows handle 14 to move vertically within the interior of the housing a short distance.

Located within housing 32 is a handle receiving member 46. Member 46 can be moved by the handle within housing 32 between an unlocked position, seen in FIG. 2, and a locked position, seen in FIG. 3.

Figure 9:
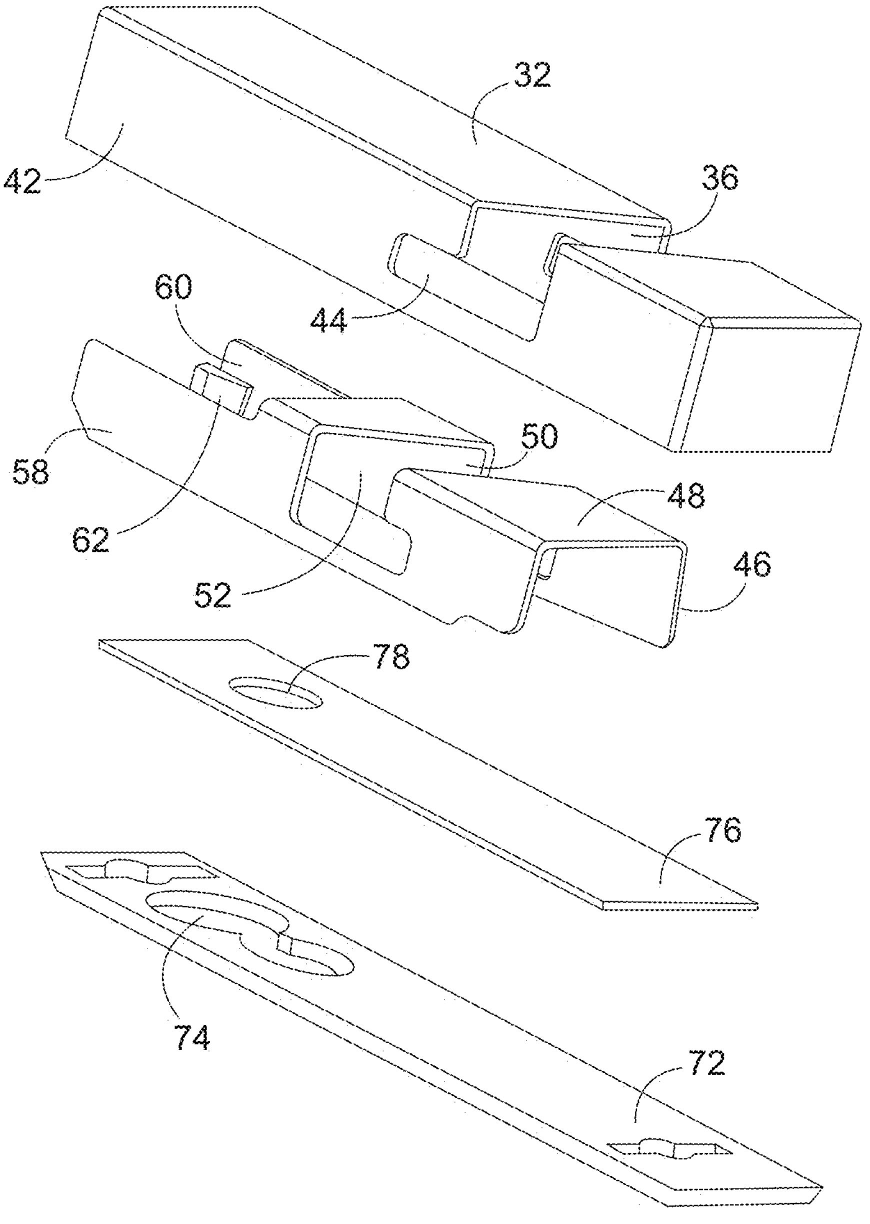
FIG. 9 is an exploded perspective view of the lock assembly and handle receiving member.

As best seen in FIG. 9, member 46 has a front surface 48 which has an opening 50 essentially the same size and shape as opening 36 in housing 32. Opening 50 is the entrance to a cavity 52 formed within member 46. Cavity 52 is adapted to receive handle 14 when opening 50 in member 46 aligns with opening 36 in housing 32, which occurs when member 46 is in its unlocked position, as seen in FIG. 2.

In that (unlocked) position, handle 14 can be moved into cavity 52 of member 46 as rod 16 is rotated such that cam 18 engages the door frame. Once the handle is situated within cavity 52, the handle can be moved upwardly relative to the housing to move member 46 to its locked position within housing 32, as seen in FIG. 3. In that (locked) position, the handle cannot move out of the housing to rotate rod 16 and the cam attached to the rod cannot disengage from the truck frame to allow opening of the cargo door.

The magnetically actuated switch 30 is situated within the housing. Switch 30 acts to generate an actuation signal via wires 28 to the electronics module 24 of the display when the member is moved away from its locked position within the housing by the handle. That actuation signal causes module 24 to change the number on the display, indicating that the handle receiving member may have moved away from its locked position toward its unlocked position, freeing the handle from the housing. In that state, it is possible that the cargo access door may have been opened without authority and the cargo may have been tampered with.

Figure 6:
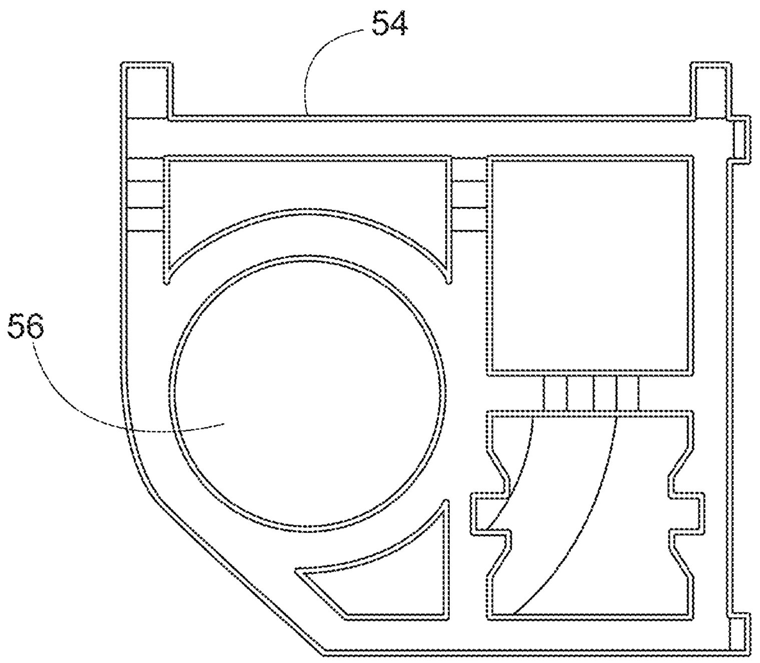
FIG. 6 is a top plan view of the switch support.

Switch 30 is mounted in a support 54 made of plastic or the like, as seen in FIG. 6. Support 54 is situated within housing 32 and fixed to the interior surface of the housing.

Figure 7:
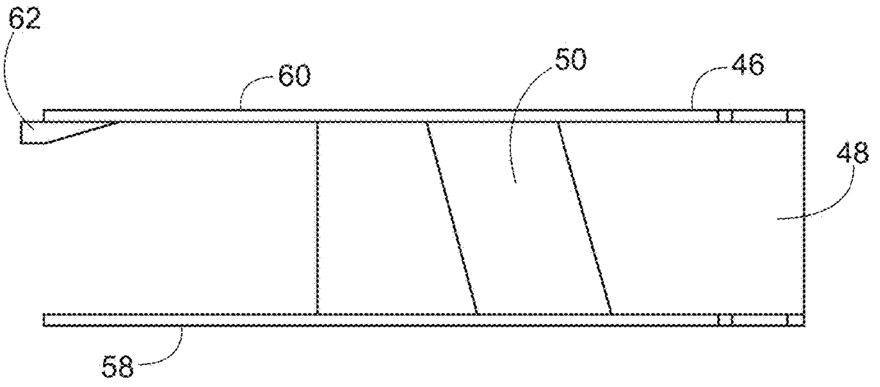
FIG. 7 is a bottom plan view of the handle receiving member.
Figure 8:
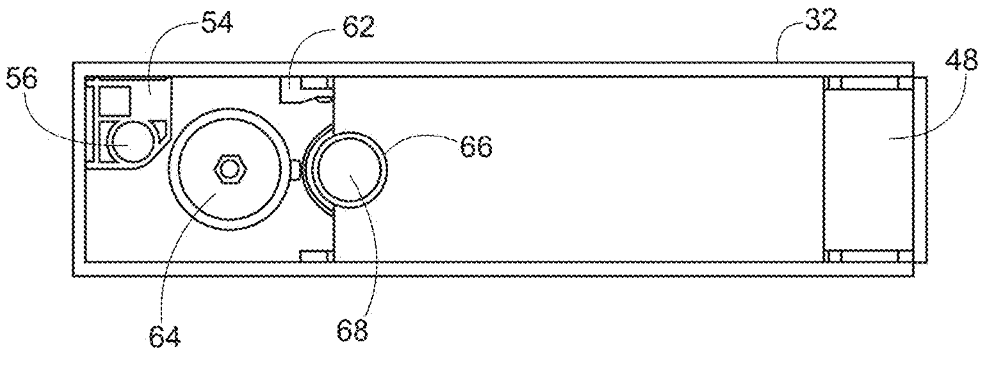
FIG. 8 is a bottom plan view of the housing with the handle receiving member in its unlocked position.

As best seen in FIG. 7, which is a bottom view of member 46, the left portion of member 46 (as seen in the drawing) has two extending side wall portions 58, 60 which define a space therebetween. A permanent magnet 62 is affixed to the interior surface of wall 60. Magnet 62 is situated on wall 60 of member 46 such that the magnet is close enough to the switch to influence the switch when the member is in its locked position. As member is moved away from its lock position, the magnet no longer influences the switch. That causes the switch to change state and generate an actuation signal.

As best seen in FIG. 4, housing 32 has a key operated lock cylinder 64 which is mechanically linked to a part 66 which carries a protrusion 68. Protrusion 68 is moved within part 66 between a retracted position and an extended position in response to the rotation of the key in cylinder 64. A lock cover 70 is pivotally attached to the top surface of housing 32 to keep dirt from entering the cylinder. Lock cylinder 64 and part 66 are situated within housing 32 such that when member 46 is in its locked position, cylinder 64 and part 66 are situated between walls 58 and 60 of member 46 and do not interfere with the movement of member 46 within the housing.

Referring now to FIG. 9, housing 32 includes a bottom plate 72 with a cut-out 74 aligned with the lock cylinder 64 and part 66. Member 46 has a bottom plate 76 with a circular opening 78. When member 46 is in its locked position, the cylinder 64 can be actuated by a key to cause part 66 to move protrusion 68 from its retracted position to an extended position wherein the protrusion 68 can enter opening 78 in bottom plate 76. Once protrusion 68 enters opening 78, member 46 is prevented from moving from its locked position within the housing and the cargo door cannot be opened.

In order to open the cargo door, the key must be inserted into cylinder 64 and rotated such that part 66 retracts protrusion 68. That causes the protrusion to retract from opening 78 to allow the handle to move member 46 away from its locked position within housing 32. Moving member 46 away from its locked position causes magnet 62 to move away from switch 30 such that magnet 62 will no longer influence switch 30. That causes the switch to generate an actuation signal to the counter C. Upon receiving the actuation signal, the electronics module of the counter causes the counter to change the displayed number, indicating that the cargo access door may have been opened.

At the destination, the cargo recipient will compare the number displayed on the counter display with the number provided by the shipper, which was set when the cargo was secured by the shipper. If the numbers match, the cargo door could not have been opened during transit and the cargo could not have been tampered with. On the other hand, if the numbers do not match, the cargo door may have been opened and the cargo may have been tampered with during transit.

Accordingly, the system of the present invention replaces the conventional plastic or metal physical seal as an indicator of possible cargo tampering and provides a much more accurate indication than a physical seal because it is not exposed to environmental conditions which may result in a false indication of possible tampering.

While only a single preferred embodiment of the present invention is disclosed herein for purposes of illustration, it is obvious that many modifications and variations could be made thereto. It is intended to cover all of those modifications and variations, which fall within the scope of the present invention as defined by the following claims.

I claim:

1. A digital seal security system for use on a vehicle of the type having a cargo compartment with a side mounted swing-out type cargo access door, a rod moveably mounted on the door for controlling access to the cargo compartment, a handle attached to the rod for controlling the position of the rod, the system comprising a digital counter adapted to display a number which is changed in response to an actuation signal and a lock assembly associated with said counter, said lock assembly comprising a generally rectangular hollow housing fixed to the vehicle door, a member comprising a recess adapted to receive the handle and being moveable within said housing by the handle between an unlocked position wherein the rod may allow the door to be opened and a locked position in which the rod prevents the door from being be opened, a magnetically actuated switch mounted within said housing, said switch being connected to said digital counter and adapted to generate an actuation signal to said digital counter in response to movement of said member from its locked position within said housing.

2. The system of claim 1 further comprising a magnet situated within said housing and adapted to influence said switch to generate an actuation signal in response to movement of said member from its locked position within said housing.

3. The system of claim 2 wherein said switch is associated with one of said member or said housing and said magnet is associated with the other of said member or said housing.

4. The system of claim 2 wherein said switch is mounted to said housing and said magnet is mounted on said member.

5. The system of claim 2 wherein said member comprises a wall with an interior surface and said magnet is mounted on said interior surface of said member wall.

6. The system of claim 5 wherein said housing defines an interior space and wherein said switch is mounted within said interior space.

7. The system of claim 2 wherein said housing defines an interior space and wherein said switch is mounted within said interior space.

8. The system of claim 7 further comprising a support structure within said housing space for supporting said switch.

9. The system of claim 8 wherein said magnet is situated to influence said switch when said member is in its locked position within said housing.

10. The security system of claim 1 wherein said housing has an opening, and wherein said member recess is aligned with said housing opening in said unlocked position of said member.

11. The security system of claim 1 wherein said housing has an opening, and wherein said member recess is not aligned with said housing opening in said locked position of said member.

12. The system of claim 1 wherein said member is generally rectangular.

13. The system of claim 1 wherein said housing opening is inclined relative to the horizontal.

14. The security system of claim 1 wherein said member comprises an outwardly extending a wall and wherein said magnet is mounted on said wall.

15. The security system of claim 1 further comprising means for locking said member within said housing in said locked position.

16. The security system of claim 15 wherein said locking means comprises a protrusion associated with said member and mounted for movement between an extended position wherein said member is prevented from moving from said locked position and a retracted position wherein movement of said member within said housing from said locked position is not prevented.

17. The system of claim 16 wherein said locking means further comprises a key actuated lock cylinder which controls said position of said protrusion.

18. The system of claim 17 wherein said member comprises first and second spaced sides defining a space adapted to receive said locking means when said member is in said locked position.

19. The system of claim 1 wherein said magnetically actuated switch comprises a reed switch.

* * * * *